United States Patent [19]
Sitbon et al.

[11] Patent Number: 5,802,370
[45] Date of Patent: Sep. 1, 1998

[54] TOOL FOR GENERATING AND EXECUTING GRAPHICAL INTERFACE COMMANDS

[75] Inventors: Gérard Sitbon, Vitry; Didier Champeval, Plaisir; Jean-François Bassier, Sucy en Brie; Olivier Levillain, Garancieres, all of France

[73] Assignee: Bull S.A., Louveciennes, France

[21] Appl. No.: 595,002

[22] Filed: Jan. 31, 1996

[30] Foreign Application Priority Data

Feb. 2, 1995 [FR] France .................. 95 01236

[51] Int. Cl.$^6$ .................. G06F 9/44
[52] U.S. Cl. .................. 395/701; 395/708; 395/333
[58] Field of Search .................. 395/701, 702, 395/706, 708, 333–335, 200.33

[56] References Cited

U.S. PATENT DOCUMENTS

| | | | |
|---|---|---|---|
| 5,438,659 | 8/1995 | Notess et al. | 395/155 |
| 5,542,069 | 7/1996 | Meppelink et al. | 395/500 |
| 5,548,756 | 8/1996 | Tantry et al. | 395/600 |
| 5,600,778 | 2/1997 | Swanson et al. | 395/333 |
| 5,603,032 | 2/1997 | Attal | 395/704 |

FOREIGN PATENT DOCUMENTS

| | | |
|---|---|---|
| 564845 | 10/1993 | European Pat. Off. |
| 9320511 | 10/1993 | WIPO |

OTHER PUBLICATIONS

NEC Research and Development, vol. 32, No. 1, Jan. 1991, Tokyo, JP pp. 130—142; Osamu Mikami & Kazushi Sugyo: "Heterogenous Computing Environment Couple" abstract; p. 132, right col., line 25 –p. 133, left col., line 10; figure 2; p. 135, left col., line 7 –p. 140, left col., line 41.

*Primary Examiner*—Emanuel Todd Voeltz
*Assistant Examiner*—Kakali Chaki
*Attorney, Agent, or Firm*—Kerkam, Stowell, Kondracki & Clarke, P.C.; Edward J. Kondracki

[57] ABSTRACT

A tool for generating and executing graphical interface commands (OGEC) for an information system (SI) including heterogeneous platforms (PLC1–PLC4) disposed in a multi-protocol (PR1 through PR6) network (RE), comprising a descriptor file (FD) which describes the graphical interface to be produced in a specific grammar, means (AL) for verifying the grammar, means (MRG) for generating a graphical representation, connected to the verification means and to the graphical interface tools, means (AS) for checking the syntax of the data entered by the user into the graphical representation, multi-protocol means (ENC) for encapsulating the attributes of each command to be executed in the target platform(s) (PLC1 through PLC4), and means for receiving the attributes of each command and for executing it (EXEC1 through EXEC4) in accordance with these attributes.

9 Claims, 1 Drawing Sheet

TOOL FOR GENERATING AND EXECUTING GRAPHICAL INTERFACE COMMANDS

FIELD OF THE INVENTION

The present invention relates to a tool for generating and executing graphical interface commands. It is more specifically applicable to an information system comprising a plurality of heterogeneous platforms connected through a network which supports a plurality of communications protocols.

DESCRIPTION OF THE RELATED ART

The information systems used in common current practice are more and more complex. They are composed of a plurality of platforms of various types generally from different manufacturers and of different sizes (small-, medium-, large-scale computers). Such platforms have both internal and external communications protocols of different types and are connected to one another through a network.

One of the important objectives for any user of a system of this type is to be able to control, at regular intervals, all of the platforms which constitute the system via an administrator in charge of cumbersome and complex management operations. This is the case, for example, for the regular (daily, weekly, monthly) operations for backing up the data written into each of the platforms (which are also commonly called "machines").

Two techniques are currently used for this purpose:

1. The first technique consists of writing, into each machine, command scripts, which are usually designated "scripts" by one skilled in the art, and of executing them as many times as there are scripts.

This technique requires:

prior knowledge of the means for routing the command, which are specific to each machine, a connection to each machine, or a remote task execution mechanism, a knowledge of the syntax for activating scripts.

2. The second technique consists of:

a) describing each object to be controlled in a common data base called a Management Information Base (MIB)

b) developing means called an agent for controlling the object in accordance with the data contained in the common data base which defines it, c) developing application for the remote utilization of the agent.

An object is any structural hardware or software element belonging to a machine in an information system which the end user desires to control remotely. Thus, the object can be a disk memory, which in the text that follows for simplicity's sake is also called a disk, or even a tape drive or a router. The end user is most often either a central administrator of the system, or a human operator who performs the control operations.

This technique requires:

the existence of a communications protocol between the control application and the agent; and taking into account, through the three means cited above (MIB, agent, utilization control application) the changes in each object to be controlled as well as each of its attributes.

No matter which of the two techniques is used, the control operations are long and complicated.

The present invention makes it possible to eliminate these drawbacks and to implement control extremely rapidly, without prior knowledge on the part of the administrator of the various communication modes used for each of the platforms.

SUMMARY OF THE INVENTION

According to the invention, the tool for generating and executing graphical interface commands for an information system comprising a plurality of heterogeneous platforms connected through a network which supports a plurality of communications protocols, is characterized in that it comprises:

a descriptor file which contains the description of the graphical interface to be produced in a grammar specific to the tool, grammar verification means which assure the lexical consistency of the descriptor file, means for generating a graphical representation, connected to the verification means on the one hand, and to the tools for the graphical interface on the other hand, means for checking the syntax of the data entered by the user into the graphical representation, means for encapsulating the attributes of each command to be executed in the target platform(s), for a plurality of communications protocols, and means for receiving the attributes of each command and executing it in accordance with these attributes.

BRIEF DESCRIPTION OF THE DRAWING

Other characteristics and advantages of the present invention will appear in the following description, given as a non-limiting example in reference to the appended drawing. In the drawing.

DESCRIPTION OF THE PREFERRED EMBODIMENT(S)

Figure 1:
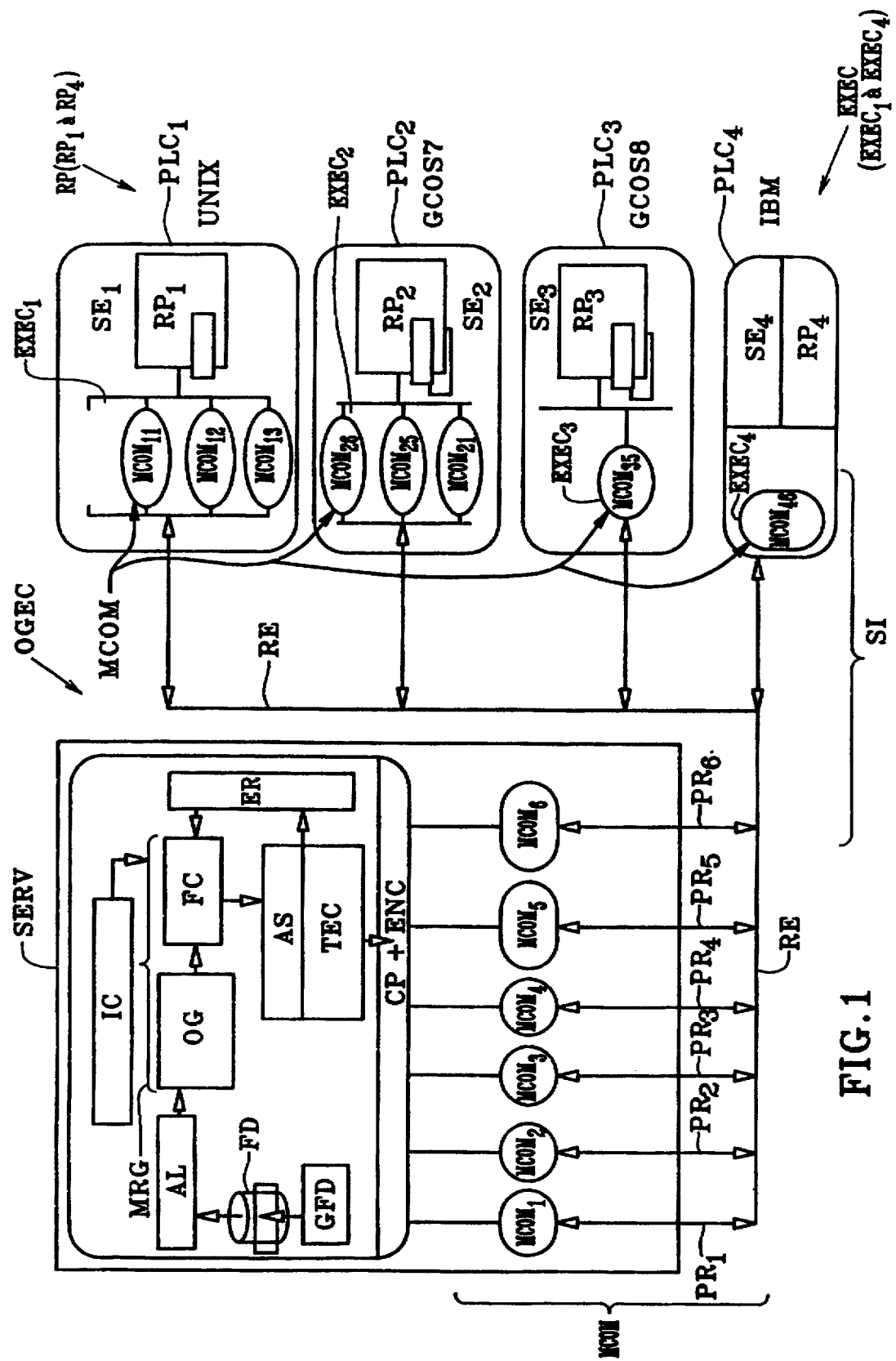
FIG. 1 shows the general diagram of the tool for generating and executing commands according to the invention.

1) Structure of the Tool According to the Invention

FIG. 1 shows the various essential elements which constitute the tool for generating and executing commands according to the invention. This tool is designated by the name OGEC. The various elements include a descriptor file FD which contains the description of the graphical interface to be produced in a grammar specific to the tool, associated with a descriptor file editor GFD, the grammar verification means which ensure the lexical consistency of the descriptor file, also called the lexical analyzer AL, means MRG for generating a graphical representation, connected to verification means AL on the one hand, and to syntax checking means AS on the other hand, means for checking the syntax of the data entered by the user into the graphical representation, also called the syntax analyzer AS, and a protocol converter CP associated with means for encapsulating ENC the attributes of each command to be executed in the target platform(s), which makes it possible to send commands by means of a plurality of communications protocols, with each protocol allowing communication with a specific target platform.

As may be seen in FIG. 1, the means for generating a graphical representation comprise management objects OG in the graphical interface and a command window FC associated with the management objects OG. In the exemplary embodiment described here, this interface is preferably the X/motif. X/motif is a registered trademark.

The editor GFD, the descriptor file FD, the generating means MRG, the syntax analyzer AS, and the encapsulating means ENC, are associated with communication means MCOM (actually, means for sending commands from the server), and are contained in a control platform, also called a server SERV or monitor connected to the end user.

The server also contains a contextual interface IC, error control means TER, and means TEC to test for the existence of the command.

Means EXEC for reception and execution are associated with a command directory RP.

2) Functions of the Various Elements

The detailed functions specific to each of the above-mentioned elements are the following:

Editor GFD

This is a set of functionalities which makes it possible to generate descriptor files, either from another descriptor file or without one.

Descriptor file FD

File FD is created by the editor GFD defined above or by an editor from the UNIX world—which can be, for example, a type VI- or EMACS-type editor, both of which are well known to the specialist in the UNIX world (UNIX is a registered trademark). Its contents are in accordance with the grammar described in Appendix 1.

For clearer comprehension, an example of a descriptor file is provided in Appendix 2.

Lexical analyzer AL

Analyzer AL analyzes the lines of the descriptor file FD and, in accordance with this grammar, generates a set of X/Motif objects in the command wrapper (see example in Appendix 3) or a set of error messages if there are inconsistencies in the contents of the descriptor file.

Contextual interface IC

Interface IC makes it possible to transmit, in accordance with the application environment, a set of data to the command window FC defined below, which facilitates the entry of the data for the end user.

By way of example, the list of target machines contained in a local or remote file, for example of the "/etc/hosts" type, is transmitted to the command window FC at the user's request.

Another example is to use an Application Programmatic Interface (API) of Integrated System Management (ISM) to obtain a list of the disks in all the platforms which have been selected in a window of an ISM application. Integrated System Management is a registered trademark.

Management objects OG

A certain number of X/Motif objects (XmText, XmScrolledList, XmForm, XmRadioBox, etc.—see Appendix 3) have been associated with the grammar defined above.

Command window FC

Window FC makes it possible to obtain a representation of the command with all of its parameters. This is achieved by means of the graphical display system (more commonly called "look & feel"), of the X/Motif graphical interface. A help text can be associated with each parameter. A command wrapper display is provided in Appendix 3.

Syntax analyzer AS

Analyzer AS allows a consistency check of each entry field in the command window, according to parameter type. For example, if the parameter is alphanumeric, the user is informed of this when he uses alphabetical characters.

Means (TEC) to test for the existence of the command

Prior to the execution of a command, TEC make it possible to verify whether it is actually available in the target machine by polling this machine during the command entry operation.

Error Control means TER

In all the above-mentioned cases of errors, TER allows a dialogue with the end user who enters the parameters into the command window and requests the execution of the associated command, telling him what type of error it is. Likewise, this module corrects the errors which result from the execution of the commands.

Protocol converter CP

Converter CP makes it possible to send the parameters of the command through communications means MCOM selected by the user in accordance with one of the following criteria:

pre-established selection chosen by the user by means of a translation table between the target platform and the communications means available in this platform, automatically in the first communications means available in this platform at the desired moment for transmitting the command.

As indicated above, the converter CP is directly associated with protocol encapsulation means ENC which add the attributes of each command to the specific elements of each protocol.

The server SERV is connected through a network various target platforms PLC1 through PLCn, only four of which have been illustrated in FIG. 1, for simplicity's sake. These four platforms are PLC1 through PLC4. Each of them is assumed to use a different operating system SE1 through SE4. These systems are, for example, of the UNIX GCOS7 and GCOS8 types, these last two being specific to the Applicant company BULL S.A., assignee of the subject invention or even the MVS type marketed by IBM.

Depending on the type of platform, a specific communications protocol is used in the network RE, and it is understood that the various communications links which correspond to each of the platforms share a common physical medium, namely that specific to the network RE. In the server SERV, these protocols are used by the communications means MCOM.

Corresponding to each of these platforms PLC1 through PLC4 are specific means for receiving and executing each command, namely EXEC1 through EXEC4. Moreover, each platform PLC1 ... PLC4 has a command directory, respectively RP1 ... RP4. This directory contains a set of instructions which describe the actions to be carried out in accordance with the parameters entered by the end user.

It is clear that the combined means EXEC1 through EXEC4 form the receiving and executing means EXEC defined above. Likewise, the combined command directories RP1 through RP4 form the global command directory RP defined above.

In a preferred exemplary embodiment of the invention, the following communications protocols PR1 through PR6 are used, respectively RPC, Rshell abbreviated RSH, CMIP, SNMP, SNA, SQL*NET, which correspond to the communication means MCOM1 through MCOM6.

All these protocols are well known to one skilled in the art. Therefore, only the aspects which are more specifically useful to the tool OGEC according to the invention will be briefly described.

The protocol RPC allows communication between different platforms, for example SERV and PLC1. RPC is the English acronym for Remote Procedure Call. It is particularly attractive because of the following aspects:

the calling program activates a function of the called program as though the called program were situated in the same platform;

likewise, the called program performs the functions as though the calling program were situated in the same platform;

the passing mode is the same for both the input and output parameters;

the format conversions are automatic (EBCDIC/ASCII, for example).

This mode of communication is used mainly for the target platforms in which the representation of the data is different from that in the server SERV. In this case the arguments for the command to be sent are the call parameters.

In the UNIX world, the command language shell ensures the external interface between the users and the operating system. It makes it possible to activate UNIX commands either interactively, or from a command file, called a script file. The remote protocol rshell (or shell: remote shell) is an extension of this language in the sense that it allows the activation of the UNIX commands in a remote machine.

This mode of communication is used mainly to make UNIX machines converse with one another. In this case, the arguments of the command to be sent are directly coded directly into a very simple form, for example ASCII, by the communication means MCOM2 using this protocol.

The protocol SNMP was born of the need to have a simple administration protocol for information systems which include a set of machines (platforms) distributed in a network. SNMP is the English acronym for Simple Network Management Protocol. It allows communication between an administration manager and the managers of the objects to be managed (for example a router, disk, tape drive), known as agents.

The SNMP protocol authorizes three actions, which are: the retrieval of data (called "get"), the setting of data (called "set"), and the spontaneous feedback of data (called "event"). It also defines the common data bases (M.I.B.).

The SNMP protocol is here used mainly for the objects which are already described in M.I.B., but whose access mode does not authorize modification by the user (set).

The SNA or SQL*NET protocols are respectively used to access platforms from the information systems manufacturer IBM, or platforms which support the standard language (SQL) for data base commands.

The target platform PLC1 therefore comprises, in the means EXEC1, receiving means which can communicate with the corresponding sending means in SERV, for the protocols RPC, RSH, SNMP, CMIP and SQL*NET. These means are designated MCOM11, MCOM12, MCOM16 in EXEC1.

In the same way, PLC2 comprises the receiving means adapted to the protocols RPC, SNA, SQL*NET, namely MCOM21, MCOM25, MCOM26 in EXEC2.

PLC3 comprises the receiving means adapted to the protocol ISO/DSA (belonging to the Applicant company) or TCP/IP, namely MCOM35 in EXEC3.

PLC4 comprises the receiving means adapted to the protocol SNA, namely MCOM46 in EXEC4.

3) Description of an Example of the Sending of Commands

It is assumed that the desire is to perform the necessary operations for archiving all the files contained in all the magnetic media in PLC1 through PLC4, which for simplicity's sake will be assumed to be magnetic disks, from the server SERV which serves as the central administrator of the information system SI which includes SERV and the set of platforms PLC1 through PLC4.

The editor GFD (or a VI-or EMACS-type editor) generates a descriptor file FD whose contents are in accordance with the grammar presented in Appendix 1. This grammar, the title "title" of which, consistent with the grammar written in conformity with the "BNF" (Backus-Naur Format) standard, as indicated in the first line of Appendix 1, is "Archiving of Files on Magnetic Media", is shown in Appendix 2. It is easy to verify in Appendix 2 that the successive script interfaces used in this file, for example "title, help, script, param action, param device, param indirect, param file and param verbose" are in fact consistent with this grammar.

The various lines of FD are then analyzed by the lexical analyzer AL which, in accordance with the grammar in Appendix 1, generates a set of command attributes which is then processed by the management objects OG and displayed in the command window FC with the X/Motif "look & feel", producing what is shown in Appendix 3. This allows the human operator of SERV to check the archiving operations in a simple, user-friendly way.

This set of command attributes then passes through the syntax analyzer AS, which checks its consistency, then through the testing means TEC, which verify that each command in the set is actually available in the target machine, which will be supposed to be the platform PLC1, for example.

The set is transmitted to the protocol converter CP which chooses the protocol PRC1 (RPC), for example. The encapsulation means ENC provide the set of commands with the parameters for sending the commands specific to the protocol PR1, in this case the call parameters.

The rest of the attributes in the set are then sent by the communication means MCOM1 through the network RE, and they arrive at the communication means MCOM11 in the target platform PLC1.

After the analysis of the protocol PR1, these means MCOM11 have the parameters which become the attributes of the command to be executed. Once this has occurred, the command is executed by the execution means specific to EXEC1 in accordance with the contents of the command directory RP1.

4) Advantages of the Tool According to the Invention

When embodied in this way, the tool according to the invention offers the following advantages:

all the commands have a unique "look & feel", whatever the platform PLC1 through PLC4, easy and rapid entry of new commands by the end user, packaging of commands specific to a given operating system (UNIX "registered trademark") in the language of another operating system (GCOS7-8), adaptation of this tool to the needs and requirements of the end users, due to the ability to use a large number of communications protocols.

Appendix 1

This is the description of the grammar of the script interfaces in BNF (Backus Naur Format standard) form:
The terminal symbols are indicated in simple quotes.
For example: 'xyz' denotes the character string xyz in the

Appendix 1-continued file. The terminal symbols can also contain regular expressions.
    The other symbols are non-terminal symbols
    The alternatives are denoted by a and enclosed in braces.
Example: {A EB} denotes either A and E, or B.
    The optional parts are indicated between brackets.
    For example: [C] denotes that C is optional.
    The annotations between parentheses are comments on the
grammar.
>>>>START OF BNF;
SCRIPT := HEADER PARAMS
COMMENT := '#.*\n' (comments to the shell)
HEADER := SCRIPT_TITLE (SCRIPT_HELP SCRIPT_EXEC
         SCRIPT_EXEC SCRIPT_HELP)
(HELP may be placed before or after the name of the executable)
PARAMS := {PARAMS PARAMPARAM}
SCRIPT_TITLE := 'title' '=' STRING (if desiring to use this title
in the main window for choosing the script, it may be necessary
to limit its size)
SCRIPT_HELP := 'help' '=' STRING
SCRIPT_EXEC := 'script' '=' FILENAME (this line could be
optional; in this case the same name as the interface file would
be used)
FILENAME := ID (it may be necessary to authorize more than ID as
a file name)
PARAM := 'param' ID '=' PARAM_PROMPT PARAM_HELP PARAM_TYPE
PARAM_PROMPT := STRING (the PROMPT for the parameter)
PARAM_HELP := STRING (the HELP for the parameter)
PARAM_TYPE := {ENTRY TEXTLIST OPTION RADIO
PASSWD
    SELECTION SLIST MLIST INTEGER
INDIRECT}
(simple text line:)
ENTRY := 'text' ENTRY_WIDTH [ENTRY_DEFAULT_VALUE]
ENTRY_WIDTH := NUMBER (the length of the text line.)
ENTRY_DEFAULT_VALUE := '(' STRING ')' (value which will initially
be displayed for the parameter. By default, it is a null
string.)
(text line passwd which displays *s in place of the characters:)
PASSWD:='passwd'
(text line which accepts only numerals:)
INTEGER:='integer' [INTEGER_DEFAULT_VALUE]
INTEGER_DEFAULT_VALUE := '(' NUMBER ')' (value which will
initially be displayed for the parameter. By default, it is 0.)
(text with several lines:)
TEXTLIST := 'textlist' ROW_COL[TEXTLIST_DEFAULT_VALUE]
ROW_COL:=NUMBER'x'NUMBER (number of lines × number of columns in
the text, all together)
TEXTLIST_DEFAULT_VALUE := '(' STRING_LIST ')' (list of strings
which will initially be displayed, one per line. By default,
nothing is displayed.)
(Boolean choice (toggle button):)
OPTION := 'option' INIT_OPTION
INIT_OPTION := '('{'false' 'true'}')' (The default value of the
toggle button:
true<->on)
(single choice by radio buttons)
RADIO :='radio' '('PROMPT_VAL_LIST')'
PROMPT_VAL_LIST := { PROMPT_VAL_LIST ',' PROMPT_VAL
PROMPT_VAL } (list of prompt_val separated by commas)
PROMPT_VAL := '(' PROMPT ',' VAL [',' 'default'] ')' (For each
prompt_val, a radio button is created which has PROMPT as its
prompt and which will return the value VAL if it is selected. The
optional part makes it possible to provide the button initially
selected from the list of buttons. If no default is provided,
the first button is chosen. If several defaults are provided, a
warning is sent and the last default selected from the list is
chosen.)
(single choice from Option Menu:)
SELECTION := 'selection' SELECTION_LIST
(choice from list with a single selection:)
SLIST := 'slist' SELECTION_LIST
(choice from list with multiple selections:)
MLIST :='mlist' SELECTION_LIST
SELECTION_LIST := '(' STRING_LIST ')' (list of strings from which
the choice will be made)
(parameters for dynamic indirect selection:)
INDIRECT := 'indirect' {INDIRECT_LOCAL INDIRECT_SNMP
INDIRECT_SQL}
INDIRECT_LOCAL := 'local' INDIRECT_LOCAL_CMD

Appendix 1-continued

```
INDIRECT_LOCAL_CMD:= '('CMD[ARGS]')' (command and list of
parameters of the command which will be called locally in order
to construct the list of possible choices. The command must
write the choices in stdout, one choice per line.)
CMD :=STRING
ARGS:= {STRINGARGS STRING}
INDIRECT_SNMP := 'snmp'INDIRECT_SNMP_CMD
INDIRECT_SNMP_CMD := '(' [ SNMP_CLASS_INSTANCES ]
SNMP_CLASS')'
SNMP_CLASS :=ID
SNMP_INSTANCE : STRING
SNMP_CLASS_INSTANCE := '(SNMP_CLASS SNMP_INSTANCE')'
SNMP_CLASS_INSTANCES := {SNMP_CLASS_INSTANCE
          SNMP_CLASS_INSTANCES
SNMP_CLASS_INSTANCE}
INDIRECT_SQL :='sql"('INDIRECT_SQL_CMD')'
INDIRECT_SQL_CMD := SQL_CONNECTID SQL_TABLES
SQL_ATTRIBUTES
       [SQL_CONDITIONS}
SQL_CONNECTID:=STRING (such as sml)
SQL_TABLES :='('ID_LIST')'
SQL_ATTRIBUTES:='('ID_LIST')'
SQL_CONDITIONS := '('SQL_CONDITION [ { 'and' 'or' }
SQL_CONDITIONS]')'
SQL_CONDITION := SQL_CONDITIONS STRING (to be revised: an
SQL_CONDITION must be parsed; it cannot be a STRING)
ID_LIST:={IDID_LIST ID}
STRING_LIST:= {STRINGSTRING_LIST','STING}
STRING := '"["]*"' (any character string between double quotes.
May be on several lines. At present, does not recognize special
characters like \n or \t.)
ID := '[a-zA-Z][a-zA-Z0-9_]*' (identifiers(<->names of
variables))
NUMBER := '[1-0][0-0]*' (whole number)
<<<<END OF BNF
Types may be added, for example FREE_INTEGER, which would be a
text line which accepts only whole numbers, or BOUND_INTEGER
which would be an XmScale, etc.
```

Appendix 2

Example of a descriptor file FD:

```
title="Achieving Files on Magnetic Media"
help="This command allows you to:
-backup a tree structure on cassette
-display the list of files stored on the medium
-restore a tree structure from a cassette"
script=tar;
param action="action";
"Choose your option from the menu:
-'extract' to restore the tree structure;
-'list' to list the files in the tree structure;
-'create' to back up the tree structure;
-'append' to add another tree structure to the same medium;
-'update' to replace a tree structure with a more recent copy";
selection ("extract", "list", "create", "append", "update");
param device="name of media drive";
"Enter the name of the media drive where the cassette is located
(often /dev/rmt0)";
text 50 ("/dev/rmt0");
param trans="type of transfer"
"choose directory if transferring a directory;
file if transferring files;
list if using a file which contains the list of files to be
transferred";
radio(("list","list");
("file","file");
("directory","directory",default);
param files="directory";
"Enter the name of the command directory/directories or command
file(s);
or the file(s) to be passed to the archiver";
textlist 10x32;
param verbose="verbose mode";
```

Appendix 2-continued

```
"select the button if you wish
to display all of the operations;
option(false). #!/bin/sh;
. /init-sh-script;
case $1 in;
extract) action=x;
list) action=t;
create) action=c;
append) action=a;
update) action=u;
esac;
if["$2"="″];
then echo "bad device"; exit 1;
fi;
if [$3 = 1];
then verbose=v;
else verbose="";
fi;
tar-"$action$verbose"f"$2;
```

Appendix 3

Command Wrapper & Execution

```
Archiving of files on Magnetic Media
This command allows you to:
-back up a tree structure on cassette
-display the list of files stored on the medium
-restore a tree structure from a cassette
           Choose your option from the menu:
   extract -'extract' to restore the tree structure
           -'list' to list the files in the trees
```

Appendix 3-continued

Command Wrapper & Execution action:
- structure
- 'create' to back up the tree structure
- 'append' to add another tree structure onto the same medium
- 'update' to replace a tree structure with a more recent copy Enter the name of the media drive where the cassette is located (often /dev/rmt0)
medium name: /dev/rmt0
Type of transfer: directory file list
   choose directory if transferring a directory
   file if transferring files
   list if using a file which contains the list of files to be transferred
Enter the name of the command directory/directories or command file(s), or file(s) to be passed to the archiver
directory:
verbose mode: select this button if you wish to display all of the operations

OK  CANCEL                      HELP

We claim:

1. A tool for generating and executing graphical interface commands (OGEC) for an information system (SI) including a plurality of heterogeneous platforms (PLC1 through PLC4) connected through a network (RE) which supports a plurality of communications protocols (PR1 through PR6), comprises:
   a descriptor file (FD) containing a description of a graphical interface to be produced in a heterogeneous platform grammar,
   grammar verification means (AL) for assuring lexical consistency of the descriptor file (FD),
   generating means (MRG) for generating a graphical representation and connected to the verification means and to the tool for the graphical interface,
   syntax checking means (AS) for checking the syntax of data entered by a user into the graphical representation,
   a converter (CP) for sending commands to the various heterogeneous platforms (PLC1 through PLC4) through a plurality of different communication means (MCOM) according to predetermined criteria,
   encapsulation means (ENC) associated with the converter for encapsulating attributes of each command to be executed in the platform(s) (PLC1 through PLC4), for a plurality of communications protocols (PR1 through PR6), and
   means (EXEC1 through EXEC4) for receiving the attributes of each command and for executing the command in accordance with said attributes.

2. The tool according to claim 1, wherein the descriptor file (FD) is operatively associated with an editor (GFD) constituted by a set of functionalities for generating descriptor files and an editor from the UNIX world.

3. The tool according to claim 2, wherein the means for generating a graphical representation (MRG) comprise:
   management objects (OG) in the graphical interface, and
   a command window (FC) associated with said management objects.

4. The tool according to claim 3, wherein the management objects (OG) in the graphical interface are X/Motif objects.

5. The tool according to claim 4, wherein the command is displayed via the command window (FC) with all of its parameters by means of the look and feel of the graphical display system of the X/Motif graphical interface, with each parameter being associated with a help text.

6. The tool according to claim 3, wherein the syntax checking means are constituted by a syntax analyzer (AS) for checking consistency of each entry field of the command window (FC), according to its parameter type.

7. The tool according to claim 3, wherein the encapsulation means (ENC) are associated with a protocol converter (CP) for sending the commands to the various platforms (PLC1 through PLC4), through the communication means (MCOM) chosen according to the predetermined criteria established by the user of the tool.

8. The tool according to claim 7, wherein the editor (GFD), the descriptor file (FD), the generating means (MRG), the syntax checking means (AS), the encapsulation means (ENC), and the communication means (MCOM), are contained in a control platform (SERV), with the other various platforms (PLC1 through PLC4) being designated target platforms, said control platform (SERV) also containing means to test for the existence of each command, making it possible to verify whether the command is available in an intended target machine.

9. The tool according to claim 1, wherein the means for verifying the grammar are constituted by a lexical analyzer which analyzes lines of the descriptor file in accordance with said grammar and generates a set of commands when there is an inconsistency in the contents of the descriptor file (FD) or a set of errors.

* * * * *